United States Patent Office 3,494,415
Patented Feb. 10, 1970

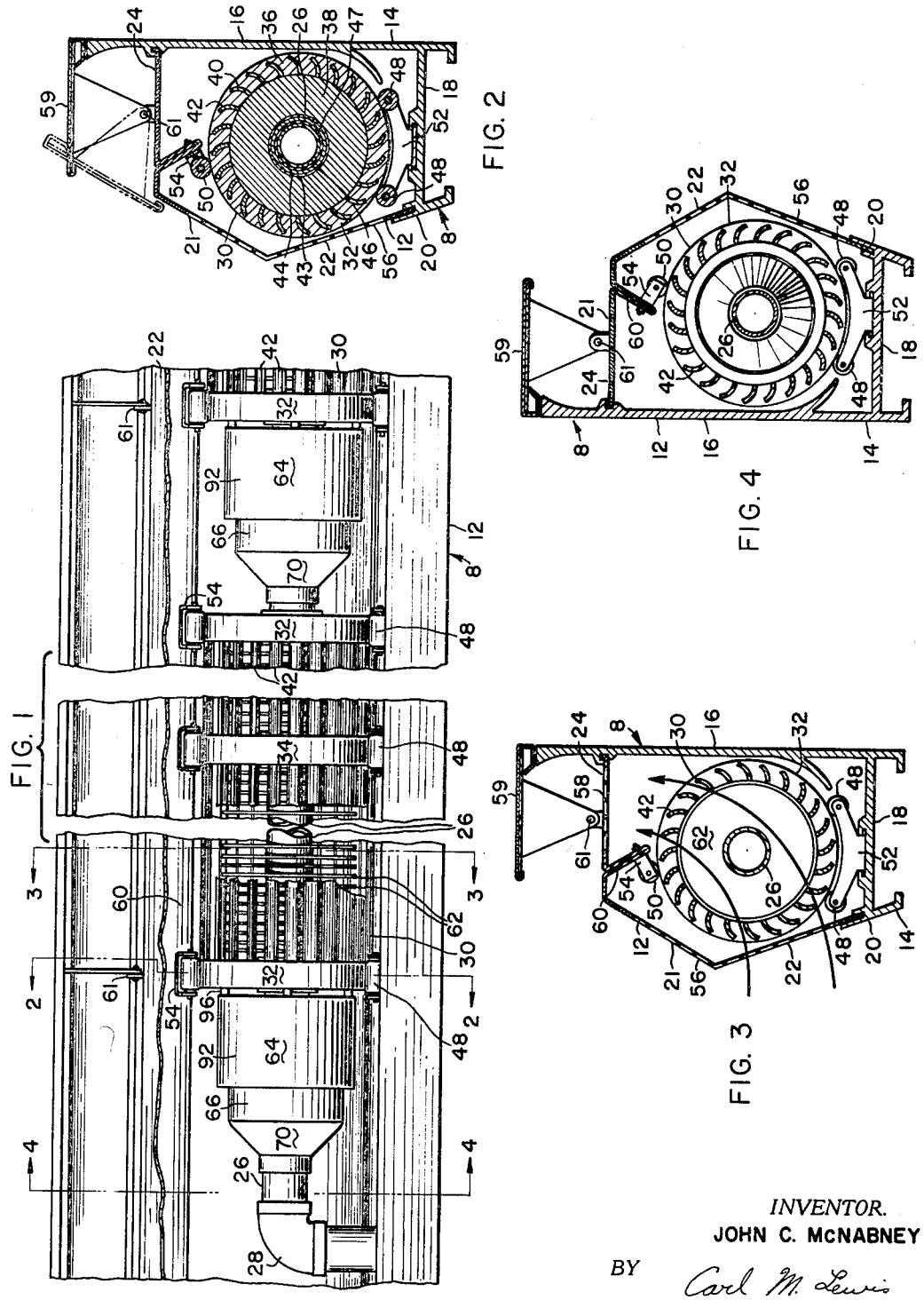

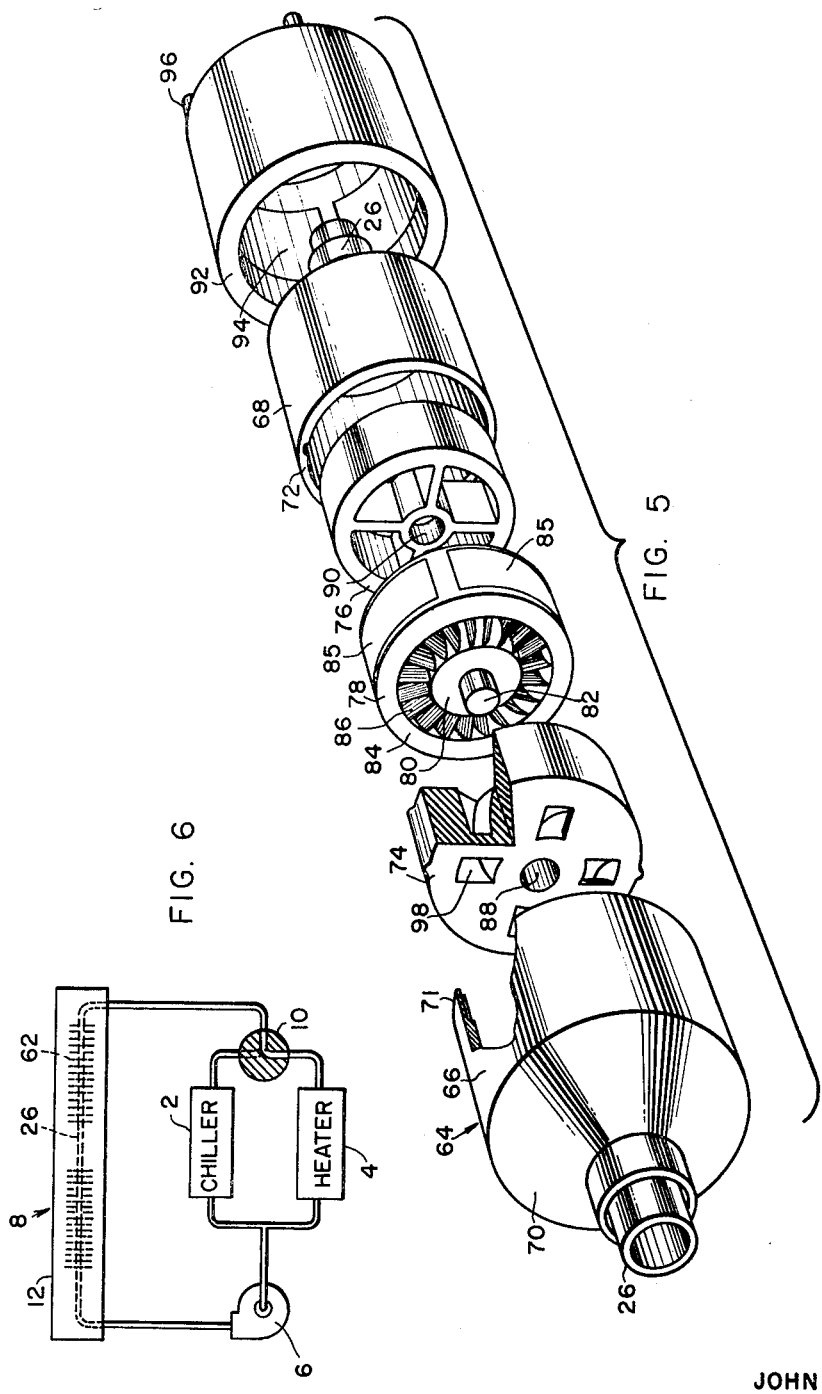

3,494,415
ROOM HEATING AND COOLING APPARATUS
INCLUDING A CROSSFLOW BLOWER
John C. McNabney, c/o The Trane Co.,
La Crosse, Wis. 54601
Filed Apr. 10, 1968, Ser. No. 720,243
Int. Cl. F24h 3/02; F28f 23/12; F24b 1/06
U.S. Cl. 165—85                                    20 Claims

ABSTRACT OF THE DISCLOSURE

A baseboard heat exchange system and apparatus for heating and cooling room air. Air is forced over a heat exchanger conduit extending through the baseboard unit via crossflow blowers having blades rotated around the conduit. The blowers are driven from axial flow turbines located within the conduit through magnetic couplings. The blowers are rotatably supported in the baseboard on a plurality of rollers. The blowers have an inner bearing givening lateral support to the conduit. The turbines are driven by both heating and cooling heat exchange fluids passing in the conduit and the unit includes an adjustable air deflector adapted to direct the air upward for cooling operation and forward for heating operation.

---

Conventional baseboard heat exchangers commonly supplied with steam or hot water utilize natural convection for passing room air over the heat exchange surfaces. The system requires no electrical power at the baseboard units, is uncomplicated in operation, and has met with substantial success for residential and commercial heating for many years.

Unfortunately little or no natural convection of air will occur if a cooling fluid is supplied to the heat exchangers of these conventional designs which for this reason are not useful heretofore for cooling purposes.

It is an object of this invention to provide a heat exchange apparatus which is useful for both heating and cooling the air in a room.

A further object is to provide such a device capable of heating and cooling which does not require electrical power at the room units.

More specifically it is an object of the invention to provide a heat exchange apparatus wherein a fluid conducting stationary heat exchanger is located within the confines of a crossflow blower whereby an extremely compact efficient heat exchange apparatus is achieved.

It is a further object to power the heat exchanger blower from a turbine driven by heating and cooling heat exchange fluid supplied to the heat exchanger.

It is further an object of this invention to provide a baseboard heat exchanger which is capable of directing cool air upwardly into the upper portions of a room and directing warm air outwardly into the lower portions of the room.

Other objects and advantages will become apparent as this specification proceeds to describe the invention in detail with reference to the drawings wherein like numerals have been used to identify like items throughout and in which:

FIGURE 1 is a front view of an elongated heating-cooling baseboard unit incorporating the invention. The front side of the unit containing an elongated air inlet has been removed to show the interior of the unit;

FIGURE 2 is a vertical section taken at line 2—2 of FIGURE 1;

FIGURE 3 is a vertical section taken at line 3—3 of FIGURE 1;

FIGURE 4 is a vertical section taken at line 4—4 of FIGURE 1;

FIGURE 5 is an enlarged perspective exploded view of the liquid driven turbine and magnetic coupling shown in FIGURE 1 for driving the blower thereof; and FIGURE 6 is a schematic of a system incorporating the heating-cooling baseboard unit of FIGURE 1.

Referring first to FIGURE 6, there is shown a water chiller 2 for cooling water and a water heater 4 for heating water. The chiller may employ a natural source of cooling or an artificial source such as a vapor compression or absorption refrigeration system. Heater 4 may employ electricity, gas, oil or coal etc. as an energy source. The outlets of chiller 2 and heater 4 are connected via a T joint to the inlet of water pump 6. The discharge side of pump 6 is connected to the heating-cooling baseboard heat exchange unit 8. The water outlet of unit 8 is connected to the common of a three-way valve 10. The two outlet connections of three-way valve 10 are connected respectively to the inlets of chiller 2 and heater 4. Thus during operation of pump 6 water is circulated from the baseboard unit 8 through three-way valve 10 to either the water chiller 2 or water heater 4. After being cooled or heated, as the case may be, the water is directed by pump 6 through baseboard unit 8. When passage of water through the chiller 2 is selected via the three-way valve 10, the water is cooled by the chiller 2 to a temperature substantially below the air to be cooled by the baseboard unit 8 whereby heat from the air passing through unit 8 is transferred to the water. When passage of water through the heater 4 is selected via the three-way valve, the water is heated by the heater 4 to a temperature substantially above the air to be heated by the baseboard unit 8 whereby heat from the water passing through unit 8 is transferred to the air.

Now referring to FIGURES 1–5 of the drawings it will be seen that the heating-cooling baseboard unit 8 includes an elongated hollow housing 12 which has a back side adapted to abut and extend along the foot of a vertical wall and a front side which faces the interior of a room.

Housing 12 is constructed of an elongated extrusion of L-shaped cross section 14 having a relatively long vertical leg 16 defining the back side of the housing and a relatively short horizontal leg 18 defining the bottom side of the housing. The back side may be provided with appropriate screw holes or other means for fastening the back side to a wall of a room. The horizontal leg 18 has an upwardly extending flange 20. Vertical leg 16, horizontal leg 18 and flange 20 together define a trough or drain pan for collecting water condensed from the air passing through the baseboard unit during cooling operation. Appropriate condensate drain lines may be located in the space immediately below leg 18.

The forward and top sides of housing 12 are constructed of an elongated member 21 of generally inverted L-shaped cross section having a relatively long vertical leg 22 forming the front of housing 12 and a relatively short horizontal leg 24 which extends rearwardly to the back side 16 of housing 12. A tongue and groove joint is used to connect legs 22 and 24 to legs 18 and 16 respectively. The tongues of member 21 can be removed from the grooves of member 14 by flexing member 21 and simultaneously pulling leg 22 upward and leg 24 downwardly and outwardly thereby permitting removal of member 21.

An elongated heat exchange fluid conduit 26 extends longitudinally substantially through the interior of housing 12. A conduit elbow 28 at each end of conduit 26 (only one shown) rigidly supports the ends of conduit 26 within housing 12 and permits piping connections to be made to the baseboard unit from the bottom thereof for passing hot or cold water through heat exchange conduit 26. Conduit 26 is supported intermediate the ends thereof via a plurality of crossflow blowers or fans 30 longitudinally spaced along conduit 26.

Each blower 30 has a pair of circular end hubs 32 and preferably one or more circular intermediate hubs 34 disposed longitudinally between hubs 32. Each of hubs 32 and 34 has an outer annular member 36 (see FIGURE 2) and an inner annular member 38. The outer rim of the inner member 38 is sized to be closely fitted within the inner rim of the outer member 36. The inner rim of the outer annular member 36 also has a plurality of circumferentially spaced radially extending slots 40 which define an annular locus for the blades of the blower. All the hubs 32 and 34 of a blower have the same number of slots 40. And corresponding slots in each of the hubs are arranged in longitudinal alignment. Disposed within each set of longitudinally aligned slots is a longitudinally extending blower blade 42. For purposes of this disclosure it should be appreciated that blades 42 need not be parallel to the axis of conduit 26 or the longitudinal axis of housing 12. It is sufficient that they merely be axially or longitudinally extending. Slots 40 may be curved to conform to the shape of the blower blade. The blades are assembled with respect to the hubs first by pressing the blades radially outwardly into the slot 42. The blades are retained in slots 40 by pressing inner annular member 38 axially into coplanar relationship with the inner rim of outer annular member 36 whereby the radially inner ends of slots 40 are closed by the outer rim of member 38. In the alternative outer annular member 36 may be split along a plane containing the axis thereof into two semicircular members in which the blades 42 are first inserted. The two semicircular members with the blades therein may then be brought together to form an annulous in circumscribing relationship to the inner annular member 38. In this position, the two semicircular members and the inner annular member may be ultrasonically welded.

The inner annular member 38 of each hub 32 and 34 has a central bore lined with a metallic sleeve 43 which has an inner surface 44 defining a bearing surface journaled for rotation on a second sleeve 46 mounted on conduit 26. Sleeve 46 may be lined on the radially inner side with a resilient liner 47 to permit conduit 26 to be expanded, for improved thermal contact with fins 62 yet to be discussed, without expanding the radially outer or journal surface of sleeve 46. The outer rim of the outer annular member 36 is laterally constrained and supported for rotation via a pair of lower bearing rollers 48 and an upper bearing roller 50. Rollers 48 are supported for rotation on a roller support member 52 connected to the upper side of horizontal leg 18 of housing member 14. Upper roller 50 is rotatably supported on a bracket 54 depending from the lower side of horizontal leg 24 of housing member 21. The outer rim of outer annular member 36, the inner surface of sleeve 43, the outer surface of sleeve 46, and conduit 26 are all concentric and coaxial. Rollers 50 and 52 are sufficiently circumferentially spaced about the hubs to constrain the hubs against substantial movement laterally of their central axis yet permit rotation of the hubs about the central axis. Conduit 26 remains stationary and is supported intermediate the ends at each of the hubs via surfaces 44 bearing against sleeves 46. Conduit 26 is constrained against rotation at the ends thereof by fixed elbows 28.

Rotation of the crossflow blower 30 about the central axis causes air to be drawn through an inlet opening 56 formed in the vertical leg 22 of housing member 21 from whence the air passes through the spaces between the blades 42 into the area radially inward of and axially coextensive with blades 42. The air leaves the blower via the spaces between blades 42 and is directed through the outlet opening 58 formed in the horizontal leg 24 of housing member 21 generally as shown by the vectors in FIGURE 3. The baseboard unit has an air deflector 59 which extends longitudinally of the housing above the outlet openings 58 and is mounted for pivotal adjustment on pivots 61 longitudinally spaced along the upper side of leg 24 of housing member 21. Deflector 59 may be adjusted to the solid line position shown in FIGURE 2 for directing the air from outlets 58 predominantly in a direction away from the wall for heating operation and adjusted to the dashed line position for directing air from outlets 58 predominantly upwardly for cooling operation. It will be understood that inlet and outlet openings 56 and 58 extend longitudinally of the housing in longitudinally coextensive relationship with each blower 30. A cut-off 60 separating inlet and outlet openings 56 and 58 extends longitudinally of the housing also in coextensive relationship with the blowers 30. Cut-off 60 is integrally formed with leg 24 of housing member 21 and is employed to support bracket 54 for roller 50.

Disposed within each blower 30 are a plurality of parallel circular fins 62 longitudinally spaced and fixedly mounted on conduit 26 in perpendicular relationship therewith. Fins 62 are formed of a material having high thermal conductivity such as copper or aluminum. Fins 62 and conduit 26 define in combination a fin-and-tube heat exchanger within the confines of each blower 30 for transferring heat between the air passing through the blower and the heat exchange fluid passing through conduit 26. As aforementioned, conduit 26 may be expanded into the fins during manufacture to enhance the thermal connection of fins 62 and conduit 26.

Each of blowers 30 is rotatably driven by a turbine 64 disposed adjacent one end thereof and which is illustrated in FIGURE 5. Each turbine 64 includes first and second cylindrical members 66 and 68 which forms an enlargement in conduit 26. Each cylindrical member has a conical end portion 70 to form the transition between the relatively small diameter portion of conduit 26 and the relatively large diameter portion of the cylindrical member. When the turbine is assembled, ends 71 and 72 of cylindrical members 66 and 68 respectively are sealingly connected. Disposed within the enlarged cavity of conduit 26 formed by members 66 and 68 is a first bearing member 74, a second bearing member 76, and an axial flow turbine wheel 78. Bearing members 74 and 76 are nonrotatably supported in cylindrical members 66 and 68 respectively.

Turbine wheel 78 includes a disc 80 having a journal 82 extending axially from each end (only one journal shown). Circumscribing disc 80 in radial spaced relationship therewith is a driver ring member 84 which has a plurality of circumferentially spaced ceramic magnets 85 embedded in the outer periphery. Wheel 78 also includes a plurality of drive vanes 86 extending radially from disc 80 to the inner surface of ring 84.

When assembled the upstream journal 82 is rotatably supported within bearing 88 of bearing member 74 and the downstream journal 82 (not visible) of wheel 78 is rotatably supported in bearing 90 of bearing member 76. Bearings 88 and 90 and upstream and downstream journals 82 are all coaxial with the central axis of conduit 26.

Circumscribing cylindrical members 66 and 68 in radial spaced relationship is a driven ring member 92 which has a plurality of circumferentialy spaced ceramic magnets 94 embedded in the inner surface thereof. Magnets 94 are disposed in axially coextensive relationship with magnets 85. Ring 92 is fixedly connected to one of the blower end hubs 32 as by pins 96. Driver ring 84, driven ring 92 and cylindrical members 66 and 68 are constructed of a nonmagnetic material exclusive of the ceramic magnets aforementioned whereby the rotation of the turbine wheel and driver ring 84 causes the rotation of the driven ring 92 via of the magnetic coupling between magnets 85 and 94. Turbine wheel 78 is rotated by the passage of the liquid heat exchange fluid axially through the anular space between disc 80 and ring 84 over vanes 78. The heat exchange fluid is given a rotational velocity prior to entering the turbine wheel by flowing through several spiral passages 98 formed in bearing member 74.

OPERATION

For heating operation, deflector 59 is pivotally adjusted to the solid line position of FIGURE 2 and the selector means, i.e. three-way valve 10, is positioned to direct water through heater 4. It is assumed that heater 4 and pump 6 are operating whereby warm water is circulated through conduit 26 causing turbines 64 to rotate blowers 30. Rotation of blowers 30 causes room air to be drawn through housing inlet openings 56, through the spaces between the blower blades, and over the circular fins 62 where upon the fins 62, which are heated by the passage of hot water through conduit 26, heat the air. The warm air is then directed outwardly through the spaces between the blower blades, through outlets 58 and directed generally horizontally into the room by deflector 59.

For cooling operation, deflector 59 is pivotally adjusted to the dotted line position of FIGURE 2 and the selector means, i.e. three-way valve 10, is positioned to direct water through chiller 2. It is assumed that chiller 2 and pump 6 are operating whereby cool water is circulated through conduit 26 causing turbines 64 to rotate blowers 30. Rotation of blowers 30 causes room air to be drawn through housing inlet openings 56, through the spaces between the blower blades, and over the circular fins 62 where upon the fins 62, which are cooled by the passage of cold water through conduit 26, cool the air. The cool air is then directed outwardly through the spaces between the blower blades, through outlets 58 and directed generally upwardly into the upper portions of the room by deflector 59. Water which may be condensed from the air during the cooling operation collects in the drain pan or trough formed by flange 20, leg 18 and leg 16 of housing member 14. The accumulated condensate may be drained from the drain pan via tubes or conduits (not shown) disposed in the space immediately below leg 18. If desired appropriate controls may be employed to automatically cycle the pump 6 in accordance with the load on the heat exchanger as for example by a room thermostat.

Having now described the preferred embodiment of my invention, I contemplate that many changes may be made without departing from the scope or spirit of my invention and I accordingly desire to be limited only by the following claims.

I claim:

1. Apparatus comprising in combination: a crossflow blower adapted to be rotated about a central axis and having a plurality of axially extending elongated blades arranged in spaced relationship along an annular locus circumscribing said axis; a fluid conduit extending in the area radially inward of and axially coextensive with said blades for conducting a heat exchange fluid of disparate temperature with respect to the air to be impelled by said blades whereby heat may be transferred between said conduit within said blower and the air passing through said blower; and means for directing air substantially radially inwardly into said area via the spaces between adjacent blades of said plurality of blades.

2. The apparatus as defined by claim 1 wherein said central axis and said conduit are coaxial.

3. The apparatus as defined by claim 1 including a hub supportingly connected to said blades, first bearing means for rotatably supporting said hub, and second bearing means for supporting said conduit for rotation with respect to said hub.

4. The apparatus as defined by claim 3 wherein said first bearing means is disposed radially outwardly of said blades.

5. The apparatus as defined by claim 3 wherein said first bearing means includes a plurality of rollers.

6. The apparatus as defined by claim 3 wherein said first and second bearing means are axially coextensive.

7. The apparatus as defined by claim 1 including means for selectively passing through said conduit a first heat exchange fluid higher in temperature than said air and a second heat exchange fluid lower in temperature than said air.

8. The apparatus as defined by claim 7 including a turbine driven by said first and second heat exchange fluids and drivingly connected to said blower.

9. The apparatus as defined by claim 1 including a turbine driven by said heat exchange fluid and drivingly connected to said blower.

10. The apparatus as defined by claim 9 wherein the axis of rotation of said turbine is coaxial with said central axis.

11. The apparatus as defined by claim 10 wherein said conduit and the axis of rotation of said turbine are coaxial.

12. The apparatus as defined by claim 9 wherein the axis of rotation of said turbine and said conduit are coaxial.

13. A baseboard heat exchanger apparatus comprising in combination: an elongated housing adapted to be mounted along the foot of a wall; an air outlet opening extending longitudinally of said housing in the upper portion of said housing; an air inlet opening extending longitudinally of said housing at an elevation lower than said outlet opening; and an elongated crossflow fan disposed longitudinally with respect to said housing and arranged to pass air from said inlet opening to said outlet opening; an elongated heat exchanger extending longitudinally through said housing; means to conduct both heating and cooling heat exchange fluids through said exchanger; an elongated air deflector disposed adjacent said air outlet opening; and means for adjusting said air deflector between a first position directing air from said outlet predominantly upwardly for cooling operation and a second position directing air predominantly in a direction away from the wall for heating operation.

14. A heat exchanger apparatus comprising in combination: an elongated housing adapted to be mounted along a wall; an air outlet opening extending longitudinally of said housing for discharging air from said housing; an air inlet opening extending longitudinally of said housing for admitting air to said housing; an elongated heat exchanger conduit extending longitudinally substantially through the interior of said housing; a plurality of axial flow turbine longitudinally spaced within said conduit; and blower means connected to be driven by said turbines for passing air from said inlet opening in heat exchange relation with said conduit to said outlet opening.

15. The apparatus as defined by claim 14 wherein said blower means is drivingly connected to said turbine via magnetic coupling means.

16. The apparatus as defined by claim 14 wherein said blower means includes a plurality of blades extending longitudinally of said housing and mounted for rotation around said heat exchange conduit.

17. The apparatus as defined by claim 16 wherein the axis of rotation of said blower means and the axis of rotation of said turbines are coaxial.

18. A heat exchanger apparatus comprising in combination: an elongated housing adapted to be mounted along a wall; an air outlet opening extending longitudinally of said housing for discharging air from said housing; an air inlet opening extending longitudinally of said housing for admitting air to said housing; an elongated heat exchanger conduit extending longitudinally substantially through the interior of said housing; a plurality of radially extending heat transfer fins spaced longitudinally along said conduit; and a crossflow blower including a plurality of blades extending longitudinally of said housing and mounted for rotation around said heat transfer fins.

19. Apparatus comprising in combination: a heat exchanger; a blower arranged to pass air in heat exchange relation with said heat exchanger; a fluid driven turbine drivingly connected to said blower; a fluid circuit serially connecting said heat exchanger and said turbine; means for selectively passing a first heat exchange fluid having a temperature higher than said air and a second heat exchange fluid having a temperature lower than said air serially through said turbine and said heat exchanger whereby said fan may be driven by the heat exchange fluid for both heating and cooling operation; said blower being a crossflow fan and said heat exchanger being disposed radially inwardly of said crossflow fan.

20. Apparatus comprising in combination: a heat exchanger; a blower arranged to pass air in heat exchange relation with said heat exchanger; a fluid driven turbine drivingly connected to said blower; a fluid circuit serially connecting said heat exchanger and said turbine; means for selectively passing a first heat exchange fluid having a temperature higher than said air and a second heat exchange fluid having a temperature lower than said air serially through said turbine and said heat exchanger whereby said fan may be driven by the heat exchange fluid for both heating and cooling operations; said turbine including a wheel supported for rotation about an axis and having a plurality of radially extending vanes, the radially outer ends of which are connected to the radially inner wall of an annulus; a plurality of circumferentially spaced magnets connected to the radially outer wall of said annulus; said magnets and said vanes being axially coextensive; and means drivingly connected to said blower and magnetically coupled to said magnets for rotating said blower in response to rotation of said turbine wheel.

References Cited

UNITED STATES PATENTS

| | | | |
|---|---|---|---|
| 2,673,074 | 3/1954 | Dailey | 165—125 |
| 2,692,759 | 10/1954 | Swenson | 165—85 |
| 3,122,983 | 3/1964 | Duggan | 165—55 |
| 3,291,203 | 12/1966 | Gough | 165—85 |
| 3,322,931 | 5/1967 | Laing | 165—122 |

MEYER PERLIN, Primary Examiner

U.S. Cl. X.R.

165—122, 125